United States Patent [19]
Benson, Jr.

[11] 3,735,644
[45] May 29, 1973

[54] REVERSIBLE POWER TRANSMISSION

[75] Inventor: Carl I. Benson, Jr., Westwood, Mass.

[73] Assignee: Paragon Gears Incorporated, Tauton, Mass.

[22] Filed: Dec. 17, 1971

[21] Appl. No.: 209,246

[52] U.S. Cl. .................................. 74/355, 192/21
[51] Int. Cl. ........ F16h 3/14, F16d 11/06, F16d 21/04
[58] Field of Search .......................... 74/355, 404 X; 192/21 X, 51, 67 R

[56] References Cited

UNITED STATES PATENTS

| | | |
|---|---|---|
| 1,442,057 | 1/1923 | Eggert .......................... 192/21 X |
| 3,555,919 | 1/1971 | Odell ............................ 74/355 |
| 2,185,537 | 1/1940 | Brownlee ....................... 192/21 X |

FOREIGN PATENTS OR APPLICATIONS 449,093   6/1948   Canada ................................ 74/355

Primary Examiner—Leonard H. Gerin
Attorney—James E. Nilles

[57] ABSTRACT

A transmission for transmitting power from a power source to a power output shaft, for example for transmitting power from an engine to a propeller shaft of a water craft. The transmission is particularly compact and the direction of rotation of the driven shaft can be selectively changed.

6 Claims, 8 Drawing Figures

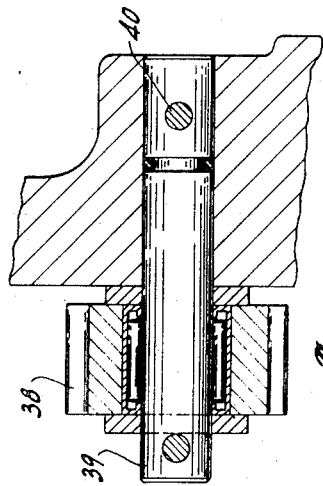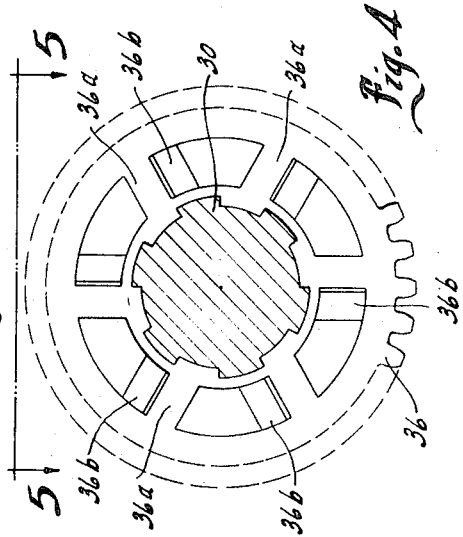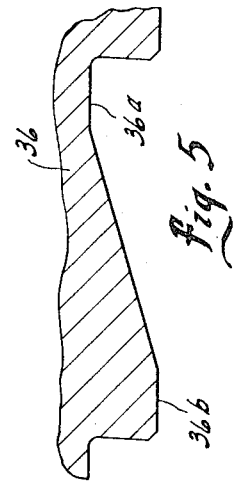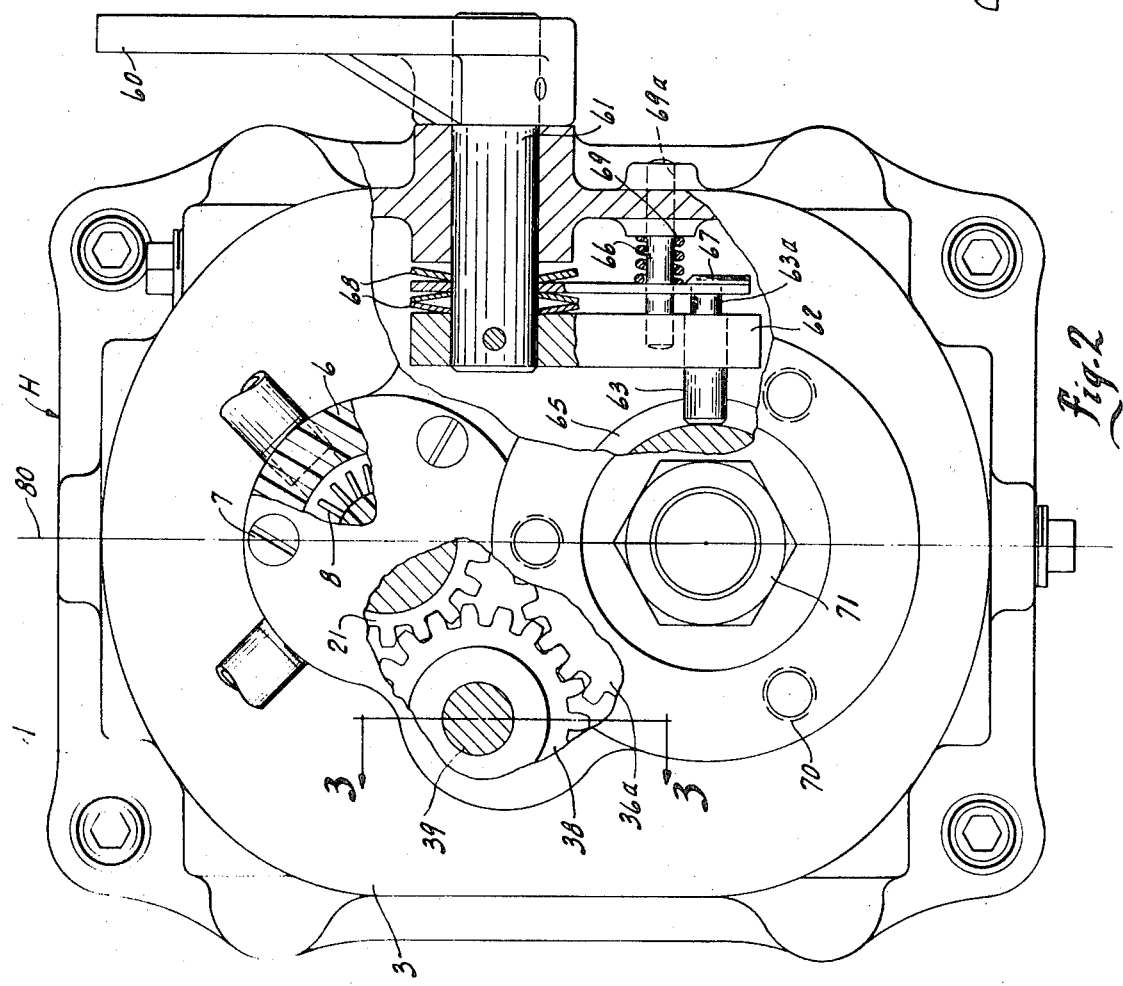

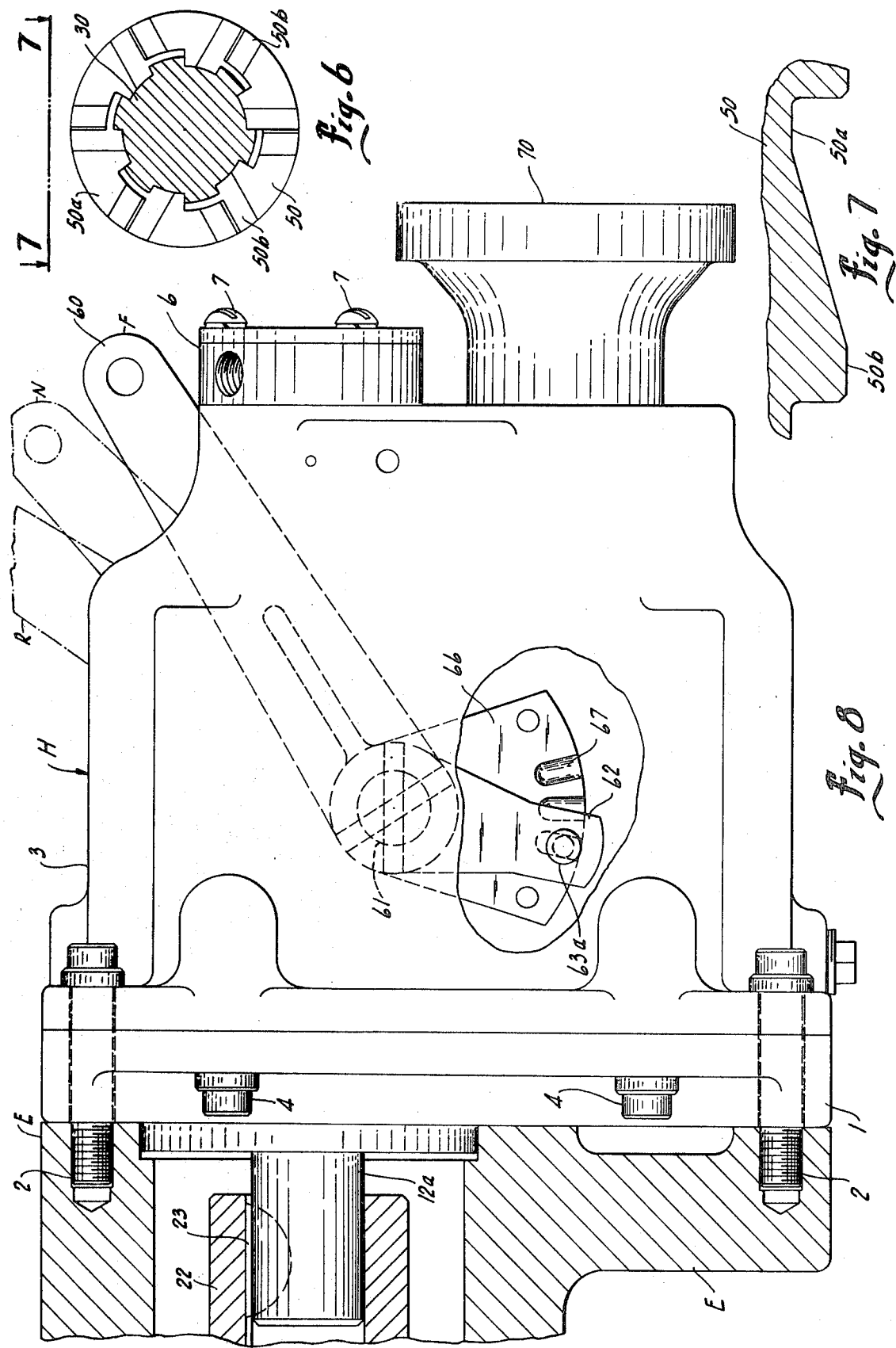

REVERSIBLE POWER TRANSMISSION

BACKGROUND OF THE INVENTION

The invention pertains to a power transmission for transmitting power from a power source to an output shaft and finds particular utility in delivering the power in either rotative direction from an engine to a propeller shaft of a water vehicle. Such transmissions are required to quickly and frequently reverse the direction of the propeller shaft. Furthermore, such transmissions should be able to accommodate power sources that have a power shaft which rotates in either direction.

Examples of such prior art transmissions are shown in the U.S. Pat. No. 3,613,469 to McRoberts et al., which issued on Oct. 19, 1971 and entitled "Power Transmission of the Hydraulically Actuated Friction Type Clutch;" and the U.S. Pat. No. 3,570,319 to Arnold, which issued Mar. 16, 1971 and entitled "Reversible Power Transmission."

Usually prior art transmissions of this type were extremeley costly to manufacture and were not versatile in their universal application as far as the direction of rotation of the power plant shaft was concerned.

SUMMARY OF THE INVENTION

The present invention provides a power transmission for transmitting power from an engine to a propeller shaft for example and which transmission is particularly compact and versatile as to the direction of rotation of the propeller shaft and also as to the direction of rotation of the output shaft of the power plant.

The above described transmission has an idler gear that can be located on either side, depending on the direction of rotation of the input shaft to the transmission.

These and other objects and advantages of the present invention will appear hereinafter as this disclosure progresses, reference being had to the accompanying drawings.

BRIEF DESCRIPTION OF THE DRAWINGS

FIG. 2 is a rear view of the transmission shown in FIG. 1 with certain parts broken away or shown in section for the sake of clarity;

FIG. 3 is a sectional view taken along line 3—3 in FIG. 1 and showing the idler gear;

FIG. 4 is a transverse view taken along line 4—4 in FIG. 1 and showing one of the gears on the output shaft of the transmission;

FIG. 5 is the radial tooth profile of the gear of FIG. 4 and taken generally along the line 5—5 in FIG. 4;

FIG. 6 is a transverse, sectional view of the shiftable jaw clutch taken on line 6—6 in FIG. 1;

FIG. 7 is a radial tooth profile of the clutch shown in FIG. 6, the view being taken generally from line 7—7 in FIG. 6; and FIG. 8 is a side elevational view of the transmission, with certain parts broken away or in section for clarity.

DESCRIPTION OF A PREFERRED EMBODIMENT

Figure 1:
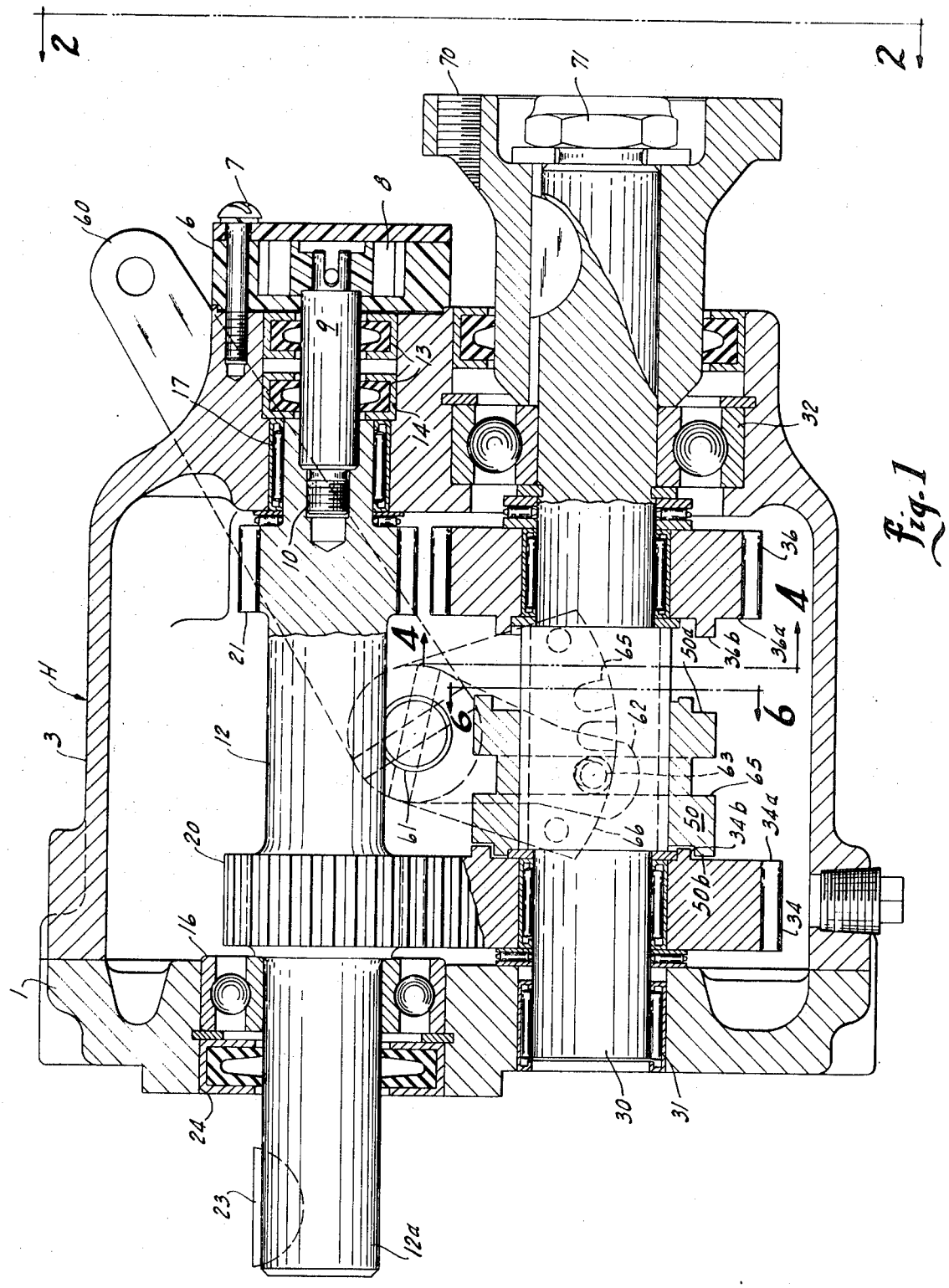
FIG. 1 is a longitudinal cross sectional view through a transmission embodying the present invention, certain parts being shown as broken away or removed for the sake of clarity.

The transmission provided by the present invention is particularly adapted to small engines such as are used to supply auxiliary power to water craft such as sailboats for example.

The transmission includes a housing H having a front plate portion 1 which is adapted to be secured by bolt means 2 to the rear end of an engine E, such as an internal combustion engine or other power plant. The housing also includes a main portion 3 which is secured by cap screws 4 to the plate portion 1. By removing the front plate portion 1, the entire interior of the main portion 3 is exposed for disassembly of the transmission.

At the rear end of the housing main portion 3 is the pump housing 6 detachably secured to the main portion 3 by the cap screws 7.

A fluid pump 8 is located within the housing 6 and is driven by its shaft 9 which in turn has a threaded, detachable connection 10 with the main input shaft 12 of the transmission. Fluid seal assemblies 13 suitably journals the shaft 9 in the counterbore 14 in the rear end of the housing main portion 3.

The input shaft 12 is suitably journalled on anti-friction bearing assembly 16 and on needle bearing assembly 17, which assemblies are mounted, respectively, in the housing portion 1 and housing portion 3.

The power input shaft 12 includes a first gear 20 which may be formed integrally therewith and the second smaller gear 21 which also may be formed integrally with the shaft 12. The forwardly extending portion 12a of the shaft is adapted to be connected to the engine power shaft 22 by the key 23 in the known manner. The bearing assembly 16 is mounted in a counterbore 24 which may be sized to permit the shaft 12 and its integral gears 20 and 21 to be withdrawn forwardly through the housing plate portion 1.

A power output shaft 30 is also journalled in the plate housing portion 1 on the anti-friction needle bearing assembly 31 and is furthermore journalled in the housing main portion 3 by the anti-friction ball bearing assembly 32. A relatively large gear 34 is freely journalled on a forward portion of shaft 30 and is in constant mesh with gear 20. Another gear 36 is also freely journalled on shaft 30.

Gears 34 and 36 have oppositely facing sides 34a and 36a. Gear 34 has a series of axially extending jaws 34b formed on its side 34a. The gear 36 has similarly shaped axially extending jaws 36b formed on its side 36a. An idler gear 38 is journalled on shaft 39 which in turn is fixed by pin 40 in the housing, and idler gear 38 is in constant mesh with both gears 21 and 36.

The gears 34 or 36 may be selectively engaged by means of the axially shiftable clutch 50 which has clutch portions 50a and 50b on its opposite sides and which are selectively engageable, respectively, with the gear clutch portions 34b and 36b.

The clutch 50 is splined to the shaft 30 for axial sliding thereon, but for rotation with the shaft 30 at all times in either direction. The clutch is axially shiftable into engagement with either of the gears 34 or 36 by means of the shifting lever 60 which is oscillatably mounted by its shaft 61 in the housing and which shaft at its inner end has a yoke 62 fixed thereon. Pin 63 of the yoke is slideably engagable in the annular groove 65 of the clutch 60 and as the lever 60 is swung in one direction or the other, It acts through its yoke to shift the clutch 50 into engagement with either the gears 34 and 36, or into a neutral position therebetween.

A detent quadrant 66 having recesses 67 is mounted on shaft 61 and Belleville springs 68 permit the spring means 69 on shaft 69a to push the detent quadrant and its recesses into engagement with protruding end 63a of pin 63. This provides a detent positioner for the lever 60.

It will be noted that the clutch teeth 34b and 36b are identical and the teeth 50a and 50b of the clutch are also identical.

At the rear end of the shaft 30 is fixed a mounting flange 70 which is held captive thereon by the nut 71 threaded on the end of shaft 30. The mounting flange 70 can thus be detachably connected in the known manner to the propeller shaft (not shown).

In operation, if the clutch 50 is engaged with the gear 34, the power is transmitted from shaft 12 and gear 20, through gear 34, clutch 50 and to the output shaft 30. On the other hand, if the clutch 50 is shifted to engage gear 36, the power from shaft 12 is transmitted from gear 21, through the idler gear 38, gear 36, clutch 50 and to the output shaft 30.

The housing 3 is so constructed and arranged that the idler gear 38 can be located on either side of the centerline 80 shown in FIG. 2, depending on the direction of rotation of the engine.

Furthermore, the entire transmission can be inverted 180 degrees to provide for being offset in an upward direction from the engine, as well as the downward offset direction, as shown in the drawings.

I claim:

1. A power transmission for transmitting power from a power source to a dirven shaft and comprising; a housing, an input shaft rotatably journalled in the housing and having a pair of gears fixed thereon, an output shaft rotatably journalled in the housing and having a pair of gears rotatably journalled thereon and having oppositely facing sides, one of said rotatably journalled gears being in constant mesh with one of the gears on said input shaft, an idler gear rotatably journalled in said housing and in constant mesh with the other of said freely journalled gears on said output shaft and the other of said gears fixed on said input shaft, said freely journalled gears on said output shaft having clutch members formed on one of their sides, a clutch axially slideable on said output shaft and having a splined connection with said output shaft for rotation therewith, and means for shifting said clutch into selective engagement with the clutch members of said freely rotatable gears on said output shaft.

2. A transmission set forth in claim 1 further characterized in that said housing includes a front plate portion having means for attachment to an engine, and said shafts are each journalled adjacent one of their ends in said plate portion, said housing also includes a main portion, and said shafts are each rotatably journalled in said main housing.

3. The transmission as set forth in claim 1 including a pump housing attached to the rear end of said main housing portion, a fluid pump in said pump housing, and a shaft detachably connecting said input shaft to said pump for driving the latter.

4. The transmission set forth in claim 1 wherein said means for shifting said clutch includes a shifting lever oscillatably mounted in said main housing portion, and a shifting yoke connected with said lever and engagable with said clutch for shifting thereof in either axial direction.

5. The transmission set forth in claim 1 wherein said main housing portion has means for rotatably supporting said idler gear on either side of the longitudinal vertical centerline of said transmission.

6. A power transmission for transmitting power from a power source to a driven shaft and comprising; a housing including a front plate portion having means for attachment to an engine, and a main portion; an input shaft rotatably journalled in said housing portions and having a pair of gears fixed thereon, an output shaft rotatably journalled in said housing portions and having a pair of gears rotatably journalled thereon and having oppositely facing sides, one of said rotatably journalled gears being in constant mesh with one of the gears on said input shaft, an idler gear rotatably journalled in said housing and in constant mesh with the other of said freely journalled gears on said output shaft and the other of said gears fixed on said input shaft, said freely journalled gears on said output shaft having clutch members formed on one of their sides, a clutch axially slideable on said output shaft and having a splined connection with said output shaft for rotation therewith, and means including a shifting lever oscillatably mounted in said housing main portion, and a shifting yoke connected with said lever and engagable with said clutch for shifting thereof in either axial direction and into selective engagement with the clutch members of said freely rotatable gears.

* * * * *